United States Patent
Yamagishi

(10) Patent No.: US 12,226,848 B2
(45) Date of Patent: Feb. 18, 2025

(54) METHOD FOR JOINING METAL MATERIALS AND CONTROLLING BONDING QUALITY THEREOF

(71) Applicant: TOYAMA PREFECTURE, Toyama (JP)

(72) Inventor: Hideki Yamagishi, Toyama (JP)

(73) Assignee: TOYAMA PREFECTURE (JP)

(*) Notice: Subject to any disclaimer, the term of this patent is extended or adjusted under 35 U.S.C. 154(b) by 147 days.

(21) Appl. No.: 17/950,319

(22) Filed: Sep. 22, 2022

(65) Prior Publication Data
US 2023/0007988 A1 Jan. 12, 2023

Related U.S. Application Data

(63) Continuation of application No. PCT/JP2021/003018, filed on Jan. 28, 2021.

(30) Foreign Application Priority Data

Mar. 27, 2020 (JP) ................. 2020-057748

(51) Int. Cl.
*B23K 20/00* (2006.01)
*B23K 20/02* (2006.01)
(Continued)

(52) U.S. Cl.
CPC ........ *B23K 20/023* (2013.01); *B23K 20/2275* (2013.01); *B23K 2103/20* (2018.08)

(58) Field of Classification Search
CPC ............ B23K 20/00–04; B23K 20/023; B23K 20/2275; B23K 2103/20; B23K 11/11;
(Continued)

(56) References Cited

U.S. PATENT DOCUMENTS 2,312,938 A * 3/1943 Stieglitz ................. B23K 11/31
91/207
6,843,405 B2 1/2005 Okamoto et al.
(Continued)

FOREIGN PATENT DOCUMENTS

CN 105522273 A * 4/2016
CN 105834608 A * 8/2016
(Continued)

OTHER PUBLICATIONS

Masoud Salamati et al. "Processing and tooling considerations in joining by forming technologies; part A—mechanical joining"; The International Journal of Advanced Manufacturing Techonology, Springer, London; vol. 101, No. 1; published online on Oct. 31, 2018; pp. 261-315 (total 55 pages).
(Continued)

*Primary Examiner* — Kiley S Stoner
(74) *Attorney, Agent, or Firm* — Harness, Dickey & Pierce, P.L.C.

(57) ABSTRACT

The method comprises applying a spot load to a joint part between a first metal material and a second metal material in a state where sites to form the joint part are superposed on each other. When a total thickness of the first metal material and the second metal material at the joint part before bonding is defined as $T_0$ mm, the total thickness thereof after bonding is defined as $T_1$ mm, and $T_0/T_1=R$ is defined as a reduction ratio, the reduction ratio R is 1.4 or more.

6 Claims, 16 Drawing Sheets

(51) Int. Cl.
*B23K 20/227* (2006.01)
*B23K 103/20* (2006.01)

(58) Field of Classification Search
CPC ........ B23K 11/34; B23K 20/22; B23K 20/24; B23K 20/02; B23K 2103/22; B23K 2103/24; B23K 9/007
USPC ....... 228/115, 234.1, 235.1–235.3, 193–195; 219/80, 86.1–94
See application file for complete search history.

(56) References Cited

U.S. PATENT DOCUMENTS

| | | | |
|---|---|---|---|
| 7,562,803 | B2 | 7/2009 | Takase et al. |
| 9,555,580 | B1 * | 1/2017 | Dykstra ............. B23K 20/1295 |
| 2007/0007253 | A1 * | 1/2007 | Wang ................... B23K 11/115 |
| | | | 219/86.25 |

FOREIGN PATENT DOCUMENTS

| | | | | |
|---|---|---|---|---|
| CN | 106736000 | A | * | 5/2017 |
| CN | 116944652 | A | * | 10/2023 |
| FR | 2883499 | A1 | * | 9/2006 ............ B21J 15/027 |
| JP | 2004-122171 | A | | 4/2004 |
| JP | 2011-031266 | A | | 2/2011 |
| JP | 2013-099776 | A | | 5/2013 |
| JP | 5830727 | B2 | | 12/2015 |
| JP | 2019-107686 | A | | 7/2019 |
| JP | 7114029 | B2 | | 8/2022 |
| KR | 0174213 | B1 | * | 2/1999 |
| KR | 20170138314 | A | * | 12/2017 |
| WO | WO-2014210266 | A1 | * | 12/2014 ............ B23K 11/20 |

OTHER PUBLICATIONS

European Search Report issued in the corresponding European Patent Application No. 21774999.3; dated Nov. 13, 2023 (total 11 pages).

"Development of Steel/Aluminum Resistance Spot Welding Process", Kojiro Tanaka, et. al, Mazda Technical Review, No. 33 (2016) pp. 124-129.

Shibata, "The Journal of the Japan Institute of Metals and Materials, 30 (1966), pp. 382-388".

Oikawa, "Tetsu-to-Hagane (In Japanese) (Iron and Steel), 83 (1997), pp. 641-646".

Yamagishi, Hideki et al., "Forge Welding of Magnesium Alloy to Aluminum Alloy Using a Cu, Ni, or Ti Interlayer", Metall. Mater. Trans. A., 46(2015)3601-3611.

Yamagishi, Hideki et al., "High-Productivity Forge Welding of AZ80 Magnesium Alloy to A2024 Aluminum Alloy Using an AC Servo Press", Metall. Mater. Trans. A., 49(2018)4659-4668.

Yamagishi, Hideki et al., "Bonding Strength and Grain Size Control of Dissimilar Joints of Al—Mg Alloys with Forge Welding", Metall. Mater. Trans. A., 51(2020)2154-2162.

Yamagishi, Hideki, "High-productivity and high-strength Fe/Al dissimilar metal joining by spot forge welding", Mater. Lett., 278(2020)128412.

Yamagishi, Hideki, "Bond strength and bonding interface of Ni/Al dissimilar joint by spot forge-welding", Mater. Lett.,299 (2021) 130080.

Yamagishi, Hideki, "Spot Forge-Welding for Rapid Dissimilar Joining of Fe to Al to Produce an Intermetallic Compound-Free Interface", Mater. Trans. 62(2021)1576-1582.

Yamagishi, Hideki, "High-Productivity and High-Strength Fe/Al and Al/Al Dissimilar Joining by Spot Forge-Welding", Metall. Mater. Trans. A, 52(2021)741-752.

Yamagishi, Hideki, "Dissimilar Spot Forge-Welding of Pure Titanium TP270 and Aluminum Alloy AA6061", Metall. Mater. Trans. A, 53 ?2022?264-276.

International Search Report for corresponding International Application No. PCT/JP2021/001827 dated Mar. 30, 2021, with English translation (4 Pages).

Reich, Michael et al., "Short-time heat treatment of press hardened steel for laser assisted clinching"; Materials Science and Technology; 2014, vol. 30, No. 11; pp. 1287-1296 (total 10 pages).

* cited by examiner

METHOD FOR JOINING METAL MATERIALS AND CONTROLLING BONDING QUALITY THEREOF

CROSS REFERENCE TO RELATED APPLICATION

This application is a continuation of International Patent Application No. PCT/JP2021/003018, having an international filing date of Jan. 28, 2021, which designated the United States, the entirety of which is incorporated herein by reference. Japanese Patent Application No. 2020-057748 filed on Mar. 27, 2020 is also incorporated herein by reference in its entirety.

BACKGROUND

The present disclosure relates to a method for joining similar or dissimilar metal materials and controlling a bonding quality thereof, and more particularly, to a novel joining method that suppresses formation of a fragile inter metallic compound (IMC: Inter Metallic Compound) at a bonding interface.

As a method for joining metal materials, a laser welding method, an arc welding method, a resistance spot welding method, or the like has been adopted.

For example, in an automobile manufacturing line, spot welding at thousands of spots per vehicle has been carried out using robots.

In recent years, active use of light alloy materials, such as an aluminum material, has been studied from the viewpoint of reduction of vehicle weight, and in that case, joining between dissimilar metal materials, such as an iron-based material and an aluminum material, becomes a significant technical problem.

In this case, fragile IMC, such as $Al_3Fe$ or $Al_5Fe_2$, is easily formed in the conventional metallurgical joining, so that it is difficult to obtain practical strength.

In "Development of Steel/Aluminum Resistance Spot Welding Process", Kojiro Tanaka, et. al, Mazda Technical Review, No. 33 (2016) pp. 124-129, it is reported that by suppressing the thickness of IMC to about 1 to 2 μm, a high bonding strength is obtained, but it is generally known that if the thickness of Fe—Al-based IMC exceeds 1 μm, the bonding strength is drastically reduced, and this method has not reached the practical level also in the production control.

In other words, a spot joining method capable of sufficiently thinly suppressing IMC in submicron order of 1 μm or less is necessary.

JP-A-2011-312661 discloses a one-side welding method in which while an electrode whose diameter is reduced toward its tip is electrically energized, the electrode is pushed against metal plates superposed on each other.

According to this publication, by pushing the tip of the electrode, a clean surface having been brought into contact with the superposed part of the metal plates and deformed is formed, but the joining principle is welding due to pressurization/energization.

The present applicant has previously proposed a method in which an insertion material is sandwiched between metal materials to be joined, and an impact load is applied thereto to mechanically press them (JP-A-2019-107686).

In order to make further improvement in versatility and productivity, the present inventor has studied, and as a result, he has completed the disclosure.

DESCRIPTION OF EXEMPLARY EMBODIMENTS

Figure 1:
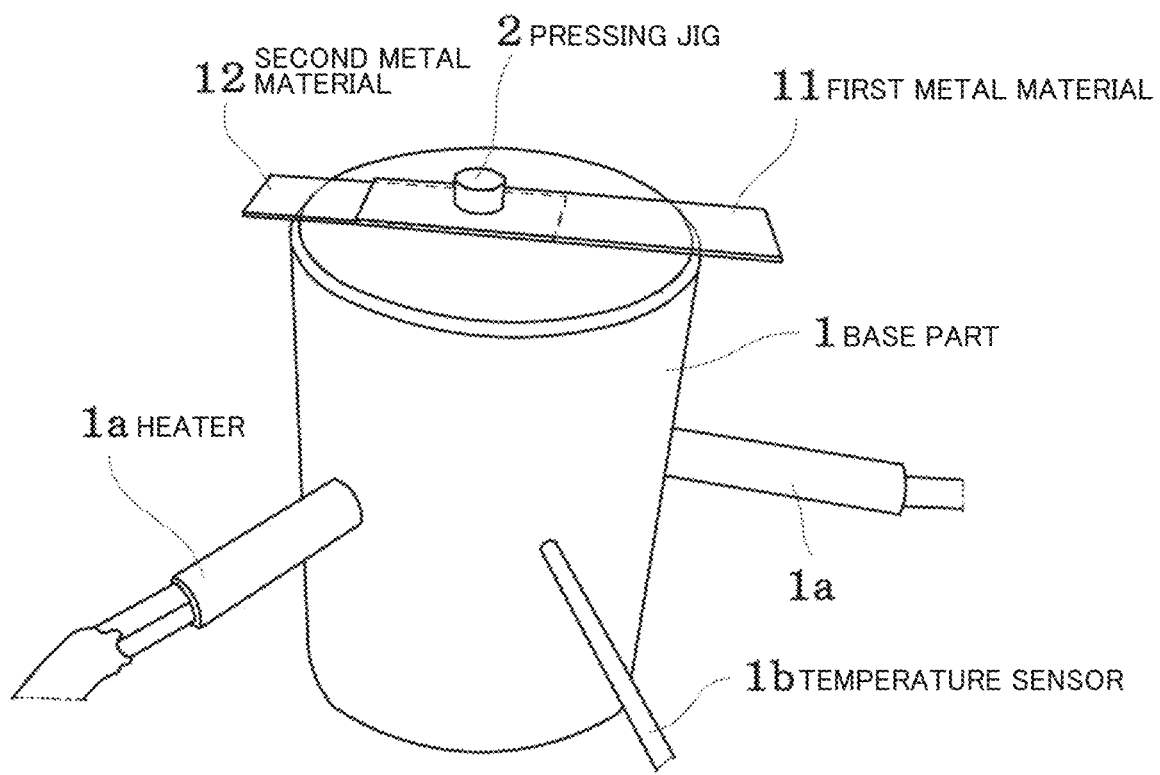
FIG. 1 illustrates an example of preparation of joined materials used for evaluation.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

It is an object of the disclosure to provide a method for joining metal materials with excellent strength and high productivity by suppressing formation of IMC at a joint part, in order to solve the above technical problem.

It is still another object of the disclosure to provide a method for controlling a bonding quality of metal materials.

The method for joining metal materials according to the disclosure comprising applying a spot load to a joint part between a first metal material and a second metal material in a state where sites to form the joint part are superposed on each other.

Here, the spot load purports that not the whole of the joint part but a prescribed region is locally pressed.

By doing in the above manner, a plastic flow is produced from the pressed part toward therearound at the bonding interface having been pressed with the spot load.

Due to the plastic flow, a newly formed surface appears at the bonding interface, and by virtue of solid phase diffusion at this newly formed surface, joining is performed.

Here, regarding the magnitude of the plastic flow at the bonding interface, when the total thickness of the first metal material and the second metal material at the joint part before bonding is defined as $T_0$ mm, the total thickness thereof after bonding is defined as $T_1$ mm, and $T_0/T1=R$ is defined as a reduction ratio, the reduction ratio R is preferably 1.4 or more.

The reduction ratio R is more preferably 1.8 or more, and still more preferably 2.0 or more.

In the disclosure, the purpose of the spot load is to allow a plastic flow to appear at the bonding interface, and the size and the shape of the load are not restricted as long as local pressing can be performed, but when it is expressed by a circumscribed circle, it may have a shape of a punch having a circumscribed circle diameter of approximately 3 to 15 mm.

In the disclosure, the purpose of the spot load is to bring substantial deformation to the joint part, and therefore, the load velocity is not restricted, and the load may be a slow static load, or may be a dynamic impact load of rapid load velocity.

When the load is an impact load, the productivity is improved as the velocity increases.

In the disclosure, the metal materials to be joined may be similar metal materials or may be dissimilar metal materials.

Examples of the similar metal materials include iron-based various metal materials and aluminum-based various metal materials.

Examples of the dissimilar metal materials include a combination of an iron-based metal material and an aluminum-based metal material, a combination of an iron-based metal material and a magnesium-based metal material, a combination of an aluminum-based metal material and a copper-based metal material, a combination of an iron-based metal material and a titanium-based metal material, a combination of an aluminum-based metal material and a titanium-based metal material, a combination of a magnesium-based metal material and a titanium-based metal material, a combination of a nickel-based metal material and an aluminum-based metal material, a combination of a nickel-based metal material and a magnesium-based metal material, and a combination of a copper-based metal material and a magnesium-based metal material.

In the case of an iron-based material, its surface may have been subjected to plating treatment such as zinc plating.

Here, the expressions of iron-based, aluminum-based, copper-based, titanium-based, magnesium-based, and nickel-based metal materials purport that their various alloys are also included.

In the disclosure, in order to facilitate the plastic flow at the bonding interface, it is preferable to perform heating within the range of solid-phase bonding.

For example, the heating temperature can be appropriately set according to the materials to be joined, e.g., 320 to 450° C. in the case of iron-based materials, or 300 to 400° C. in the case of aluminum-based materials.

The disclosure is a novel joining method in which a spot load is applied to a joint part of metal materials to perform solid phase bonding using a newly formed surface caused by a plastic flow produced at a bonding interface, and therefore, this method is referred to as forge welding as needed.

In the forge welding according to the disclosure, formation of IMC at the bonding interface can be suppressed, and even when IMC is formed, its thickness can be suppressed to several nanometers to several tens of nanometers level (mesoscopic region) though the details will be described later, and therefore, there is no adverse effect causing deterioration of mechanical properties, and virtually, it is an IMC-free joining method.

In this respect, the method of the disclosure is excellent in bonding quality (strength) and processing tolerance as compared with the conventional technology in which the thickness of IMC can be suppressed to only 1 to 2 µm level.

Figure 7A:
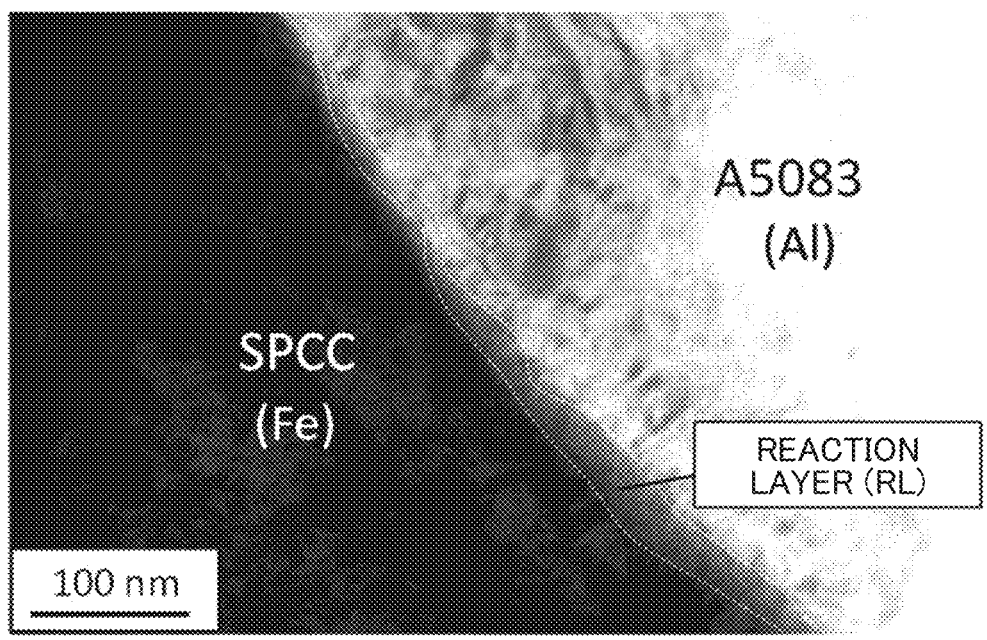
FIG. 7A illustrates an observation image of a bonding interface in the joining of SPCC (Fe) and A5083 (Al) taken by a transmission electron microscope (TEM)
Figure 7B:
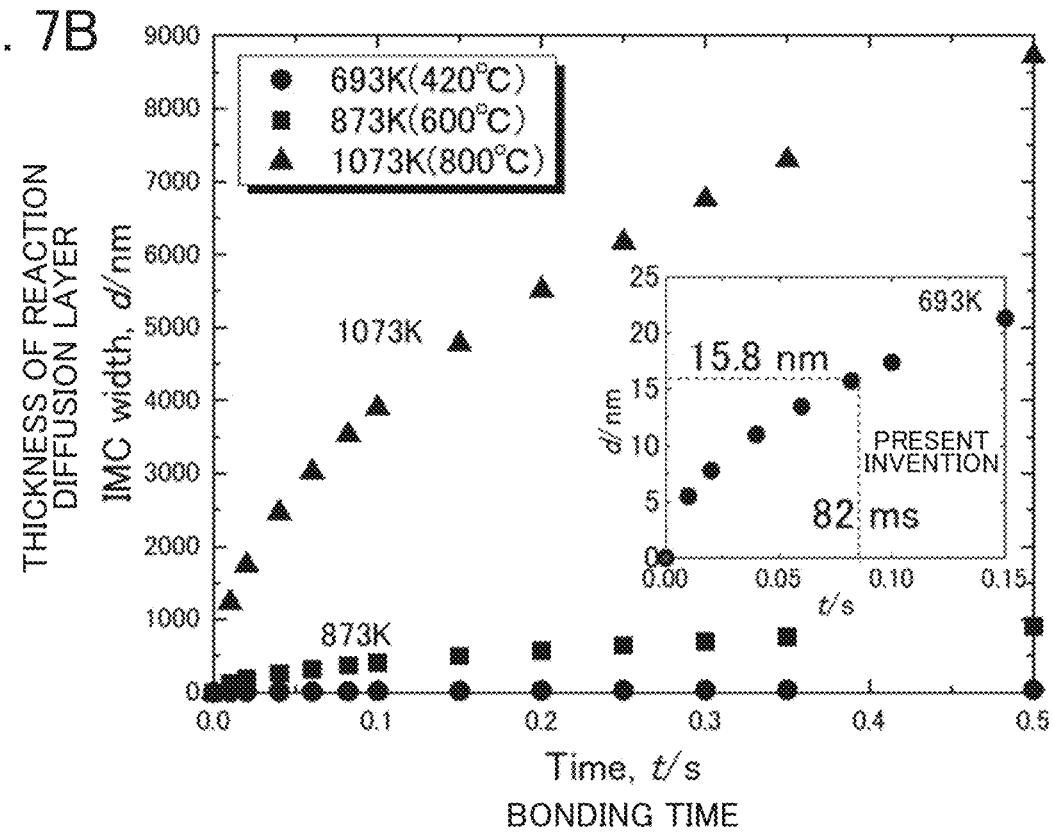
FIG. 7B illustrates a graph obtained by numerical calculation regarding a relationship between bonding time and growth of thickness of a reaction diffusion layer at various bonding temperatures in the diffusion bonding of iron to an aluminum alloy.

To describe this using, for example, a resistance spot welding method that is one of conventional methods, the electrical energization time must be controlled in a short time in order to suppress the thickness of IMC, but for securing bonding quality, the temperature needs to be raised to a melting point of the joining material (about 700° C. in the case of aluminum alloy) or to a temperature higher than that, and therefore, IMC with a critical thickness (about 1 µm) is inevitably formed (FIG. 7B referred to later).

In contrast with this, the joining mechanism of the disclosure is to form a plastic flow interface on the bonding surface, so that the joining process can be performed at a low temperature for an extremely short time, and this IMC can be suppressed in the mesoscopic region.

Therefore, the method of the disclosure is excellent in time processing tolerance as compared with the conventional method.

That is to say, even if rough control such as some variation in the processing conditions is made, the thickness of IMC formed at the interface does not become critical, that is, the tolerance in the production technology is high.

In the disclosure, preheating of the joint part before application of a spot load may be carried out by heating it with an electric furnace or the like in advance, or may be carried out by locally heating the joint part to a prescribed temperature with a laser beam, a flame, electrical energization, electromagnetic induction, or the like, but as the most practically applicable style, Joule heat due to electrical energization, which is the same as in the resistance spot welding used in the automobile manufacturing line, can be used.

In the disclosure, since the heating temperature required for the joint part is low, the electric current required is also sufficiently smaller than that in a common resistance spot welding method, and thereby, there is an advantage that the conventional electric circuit and system become significantly more compact and more inexpensive.

The method for controlling a bonding quality of metal materials according to the disclosure, comprising controlling with a reduction ratio R the bonding quality of a first metal material and a second metal material to which a spot load is applied at a joint part between the first metal material and the second metal material in a state where sites to form the joint part are superposed on each other,
wherein when a total thickness of the first metal material and the second metal material at the joint part before bonding is defined as $T_0$ mm, the total thickness thereof after bonding is defined as $T_1$ mm, and $T_0/T_1=R$ is defined as the reduction ratio.

In the disclosure, moreover, the bonding quality is improved, and for example, it becomes possible to evaluate the bonding strength by the reduction ratio R described above, and reduction or omission of the conventional destructive test also becomes possible, so that the quality control at the production site is facilitated.

Furthermore, it is also possible to perform joining with spot pressure means in a short time, and therefore, it can be expected that incorporation of this joining into the conventional production system such as a manufacture line for vehicles is also facilitated.

Hereinafter, the forge welding according to the disclosure will be described based on specific examples, but the metal materials to be joined and the joining conditions are not limited to these examples.

In the actual manufacturing line, for example, various press machines and robots equipped with C-type arms using an actuator or the like can be applied, but in the experimental examples described below, an AC servo press device in which stroke motions were controlled by a servo motor was used.

In FIG. 1, an experimental method is illustrated.

On a bolster of an AC servo press device, illustration of which is omitted in the figure, a base part 1 is set, and on the base part 1, sites to form joint part between a first metal material 11 on the upper side and a second metal material 12 on the lower side are superposed on each other.

The base part 1 is made temperature-controllable by a heater 1a and a temperature sensor 1b.

For applying a spot load to the joint part, a pressure jig 2 for punching, which is produced from alloy tool steel for hot dies JIS SKD61, is placed on this joint part, and a load is applied to this pressing jig 2 with a slide of the press machine through position control.

For the pressing jig 2 or the base part 1, a copper-based or tungsten-based material may be used because of heating by electrical energization or resistance to high loads.

Regarding the surface shapes of the pressing jig 2 and the base part 1, a shape of appropriate curvature or curved surface, such as a lens shape, may be made so as to form a good plastic flow interface, taking into account the strength difference between the metal material 11 and the metal material 12, the strength difference between the pressing jig 2 and the metal material 11, or the like.

In that case, if the material is a difficult-to-cut material such as a tungsten-based material, it is preferable to produce them by a sintering method or a lamination molding method.

Example 1

As the first metal material 11 on the upper side, a cold-rolled steel plate (SPCC) having width W: 20 mm, length L: 80 mm, and thickness $t_1$: 1 mm was used, and as the second metal material 12 on the lower side, an aluminum alloy sheet material of JIS A5083 having W: 20 mm, L: 80 mm, and $t_2$: 1 mm was used.

Here, SPCC is a common cold-rolled steel plate, and is obtained by cold rolling a hot-rolled mild steel plate at normal temperature.

A5083 is an Al—Mg-based alloy sheet material.

The base part 1 was preheated to a surface temperature of about 300° C.

SPCC and A5083 were heated in advance, and during bonding, the temperature of the interface became 420 to 430° C.

In this state, an impact load was applied to a pressing jig 2 of ϕ10 mm (referred to as forge welding diameter as needed).

Figure 2A:
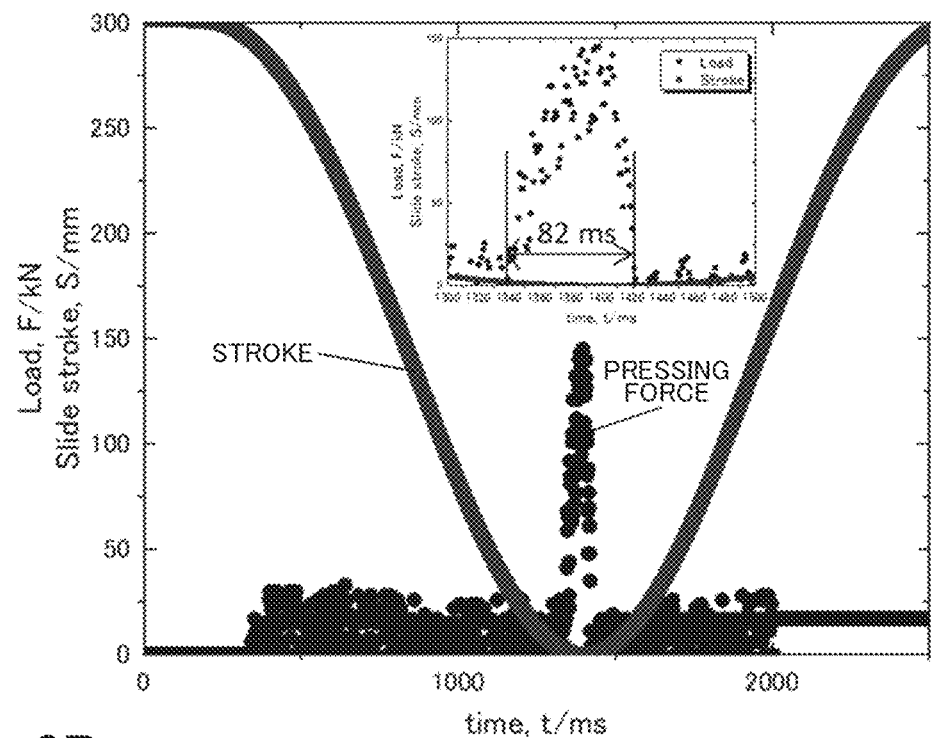
FIG. 2A illustrates a relationship between slide stroke and pressing force of an AC servo press machine in the joining of SPCC and A5083.

In FIG. 2A, a press processing graph in which time (ms) is plotted as abscissa, and load (Load, kN) and slide stroke (mm) are plotted as ordinate is illustrated.

Figure 2B:
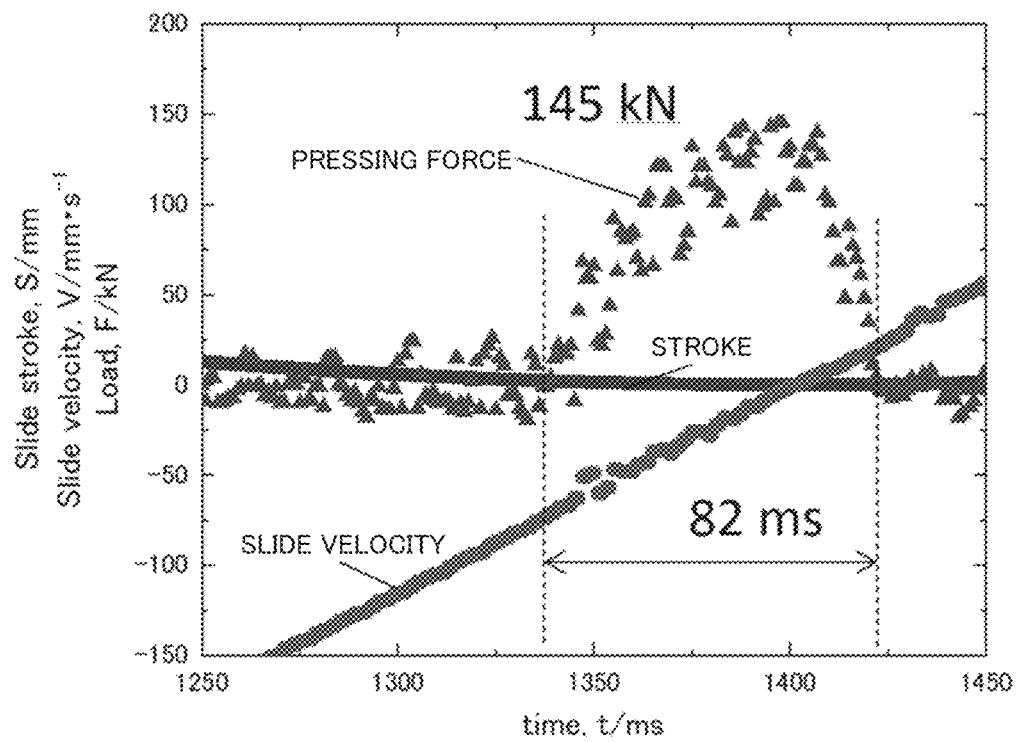
FIG. 2B illustrates, in detail, variations thereof including slide velocity at the moment of bonding.

In FIG. 2B, an enlarged view given when the load was varied is illustrated, and slide velocity (load velocity) is also illustrated together.

The pressing time was 0.082 second (82 ms), and the maximum load was 145 kN.

In the present experiment, the pressing velocity due to descending of a slide was about 75 mm/s, and the load became an impact load.

Figure 3:
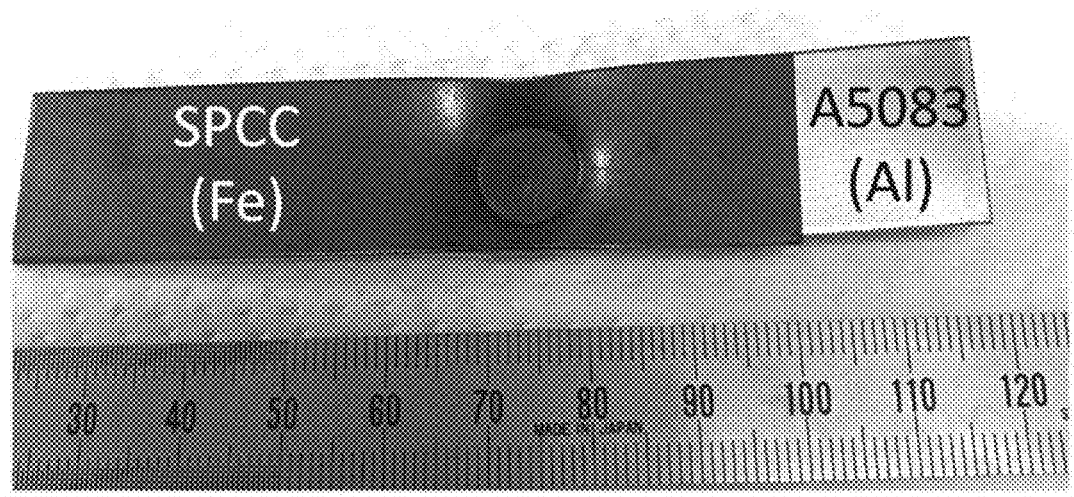
FIG. 3 illustrates a photomicrograph of joint appearance (punching side, front view) after bonding in the joining of SPCC (Fe) and A5083 (Al).
Figure 4:
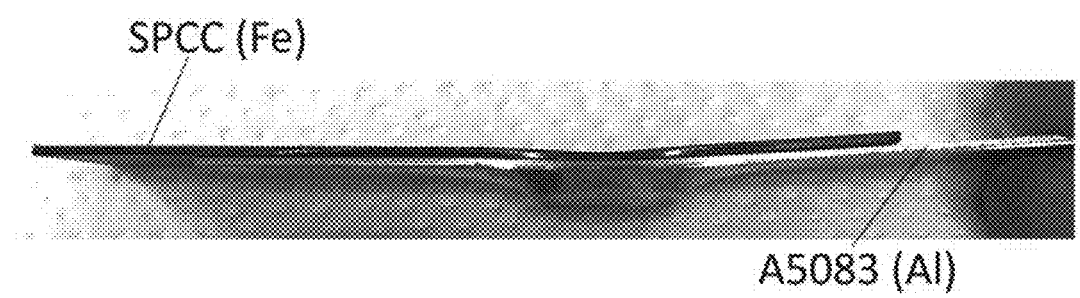
FIG. 4 illustrates a photomicrograph of joint appearance (side view) after bonding in the joining of SPCC (Fe) and A5083 (Al).

A front appearance photomicrograph and a side appearance photomicrograph of the resulting bonded joint are illustrated in FIG. 3 and FIG. 4, respectively.

In FIG. 3, it can be seen that an indentation due to the pressing jig 2 was formed at the superposed part of the first metal material SPCC on the upper side and the second metal material A5083 on the lower side.

Figure 6:
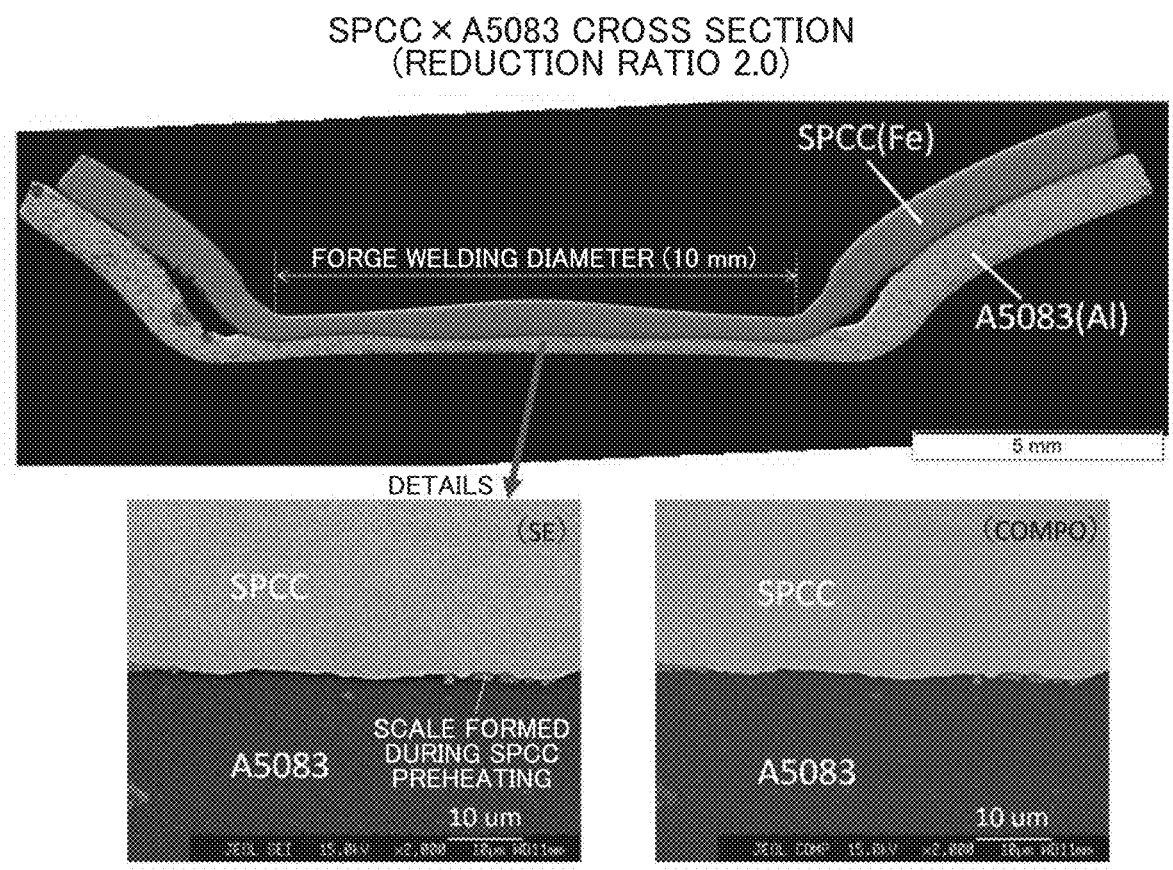
FIG. 6 illustrates cross-sectional observation images of a joint part in the joining of SPCC (Fe) and A5083 (Al) taken by a metallurgical microscope and a scanning electron microscope (SEM).

In the side view illustrated in FIG. 4, it can be seen that the superposed part protrudes downward (see cross-sectional view of FIG. 6).

It has become apparent that superposition of SPCC having a higher strength in the first and the second metal materials on the upper side is easier to join the metal materials.

The reason is that if pressing is performed from the side of a relatively high strength, bouncing of the lower side metal material that is relatively soft is suppressed, as illustrated in FIG. 4.

Since the total thickness $T_1$ of the superposed part after bonding was 1 mm, $T_0(t_1+t_2)/T_1$: reduction ratio R=2.0 was obtained, and when a tensile test (tensile rate 0.1 mm/s) in which both ends of a test piece were chucked was performed, base material fracture on the A5083 side occurred at about 3.8 kN.

Figure 5:
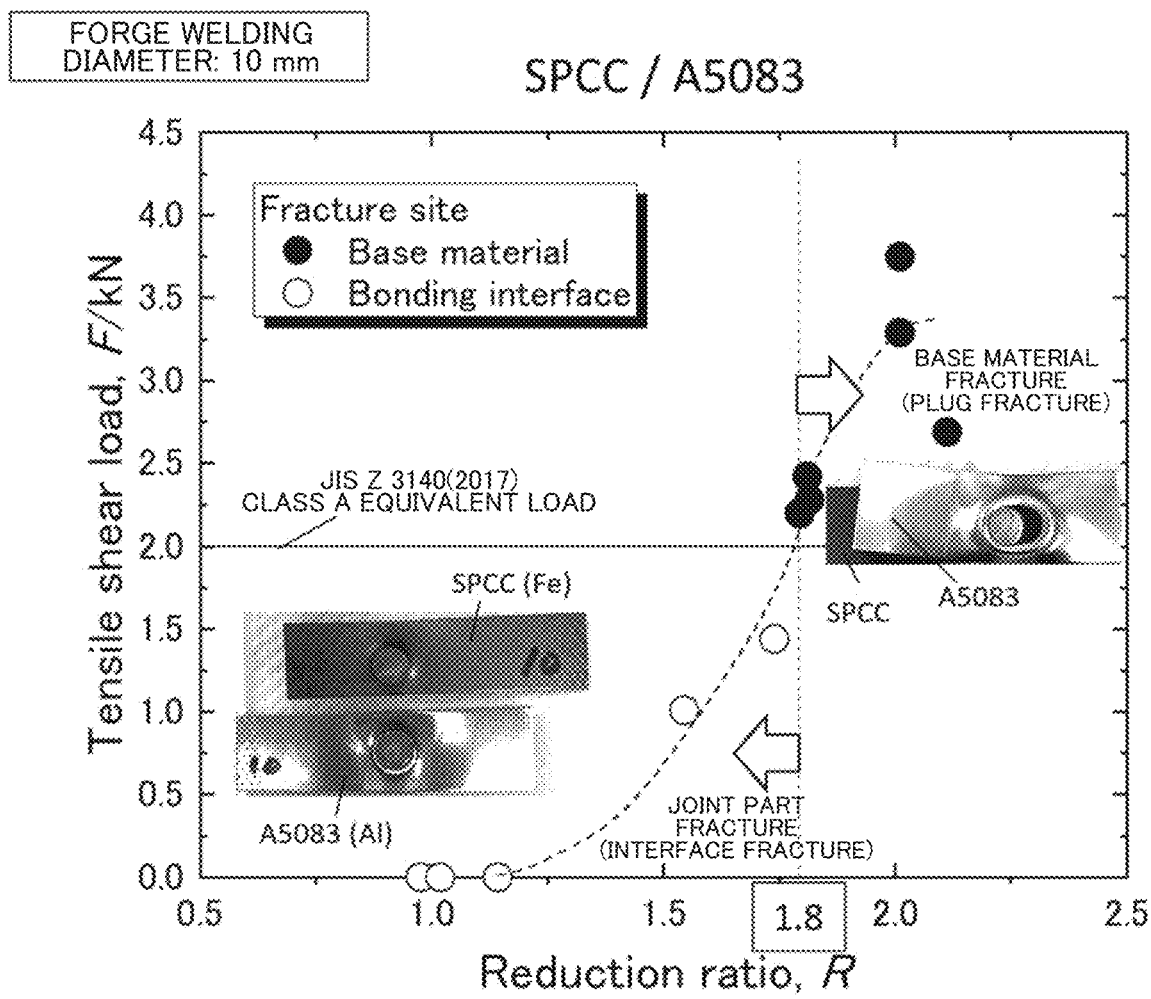
FIG. 5 illustrate a relationship between reduction ratio R and tensile shear load F of a joint in the joining of SPCC (Fe) and A5083 (Al).

Next, therefore, the slide bottom dead center (punch insertion amount) was varied, and a relationship between the reduction ratio R and the tensile shear load F of the joint part was graphically expressed, as illustrated in FIG. 5.

As a result, when the reduction ratio R was small, fracture occurred at the bonding interface, but when the reduction ratio R was about 1.8 or more, base material fracture on the A5083 side (plug fracture in which the periphery near the joint part fractures) occurred. The plug fracture is one of failure criteria of joint parts required in the automobile industry, and the present method satisfies this.

Regarding the strength obtained in the present joining method, when the tensile strength of A5083 (O material) is set to 290 MPa, the tensile shear strength Class A of the spot welds between A5083 sheets each having a sheet thickness of 1 mm, which is defined by JIS Z3140 (Method of inspection and acceptance levels for resistance spot welds), becomes about 2 kN, and it has become apparent that in the present method, the tensile shear strength sufficiently exceeds this standard even in the case of Fe/Al dissimilar material joining.

A cross-sectional photomicrograph of a joint part with a forge welding diameter of 10 mm and a reduction ratio R of 2.0 in a test piece obtained by joining a combination of SPCC/A5083 (Al), which has been taken by a metallurgical microscope, is illustrated in FIG. 6.

It can be seen that the thickness of the joint part decreased, and a plastic flow appeared.

The joint part is present along a pressed surface where pressing has been selectively performed by punching.

Accordingly, it can be understood that the joint part along the pressed surface (plastic flow interface) is not a side surface of an indentation formed around the pressed part, and therefore, the bonding strength does not depend on the mechanical joining mechanism.

On the bottom of FIG. 6, a secondary electron image (SE) of the nearly central bonding interface and a backscattered electron image (COMPO) thereof taken by a scanning electron microscope (SEM) are illustrated.

In FIG. 7, a bright-field image obtained by observing the bonding interface by TEM at higher magnification is illustrated.

As a result, it can be seen that the thickness of a metallurgical reaction layer (RL) at the bonding interface where a scale presumed to have been formed during preheating of SPCC was divided to produce a newly formed surface, that is, the thickness of IMC can be extremely thinly suppressed to several nanometers to several tens of nanometers level.

According to the reports by Shibata, "The Journal of the Japan Institute of Metals and Materials, 30 (1966), pp. 382-388", and Oikawa, "Tetsu-to-Hagane (in Japanese) (Iron and Steel), 83 (1997), pp. 641-646", it is indicated that the growth rule of the reaction diffusion layer in Fe and Al can be expressed by the following expression.

$$d = \sqrt{Kt}$$

$$K = K_0 \exp\left(\frac{-Q}{RT}\right)$$

d: thickness (m) of reaction diffusion layer (IMC)
t: heating time (s)
K: reaction rate constant
$K_0$: frequency factor (m$^2$/s), Fe/A5052: $5.68 \times 10^{-2}$ (m$^2$/s)
Q: activation energy (J/mol), Fe/A5052: 176 kJ/mol
R: gas constant (J/mol·K$^{-1}$)
T: bonding interface temperature (K)

In FIG. 7B, growth behavior of the IMC thickness against the bonding time, which is obtained by assuming three kinds of bonding temperatures of 1073 K (800° C.), 873 K (600° C.) and 693 K (420° C.) and performing calculation according to the above relational expression, is illustrated.

In the experiment evaluation of this time, the interface temperature during the bonding was about 420° C., the bonding time was about 82 ms, and when these values are allowed to correspond to the graph of FIG. 7B, the calculated value of the thickness of IMC has proved to be about 15.8 nm. This value is almost consistent with the thickness of the reaction layer (RL) observed in FIG. 7A.

When the thickness of IMC is set to 1 μm at which strength reduction becomes a significant problem in Fe/Al, the bonding time permitted at each bonding temperature assumed (time required for growth of IMC to 1 μm) is as short as about 0.007 s (7 ms) at 1073 K (800° C.) or about 0.6 s at 873 K (600° C.) from the above relational expression, but on the other hand, in the experiment of this time, the bonding time at a process temperature of 693 K (420° C.) is about 330 s and is long in a different order of magnitude. Since the joining method of the disclosure is a low-temperature joining method, it can be clearly understood from their comparison that in the process of the method, the time tolerance is extremely large in the control of IMC.

Accordingly, the joining method according to the disclosure makes it possible to realize an IMC thickness in the mesoscopic region by performing spot pressing at a low temperature for a short time.

Example 2

Next, using a high tensile strength steel plate SPFC980 having W=30 mm, L=100 mm, and $t_1$=1 mm as the first metal material and using an aluminum alloy sheet material JIS A5083 having W=30 mm, L=100 mm, and $t_2$=1 mm as the second metal material, joining was performed in the same manner as in Example 1 under the conditions of a pressing jig diameter (forge welding diameter) of 5 mm (D5), 8 mm (D8) or 10 mm (D10).

Here, SPFC980 refers to a steel plate having a tensile strength of 980 N/mm$^2$ or more among steel plates obtained by further subjecting hot-rolled steel plates to cold rolling.

Figure 8A:
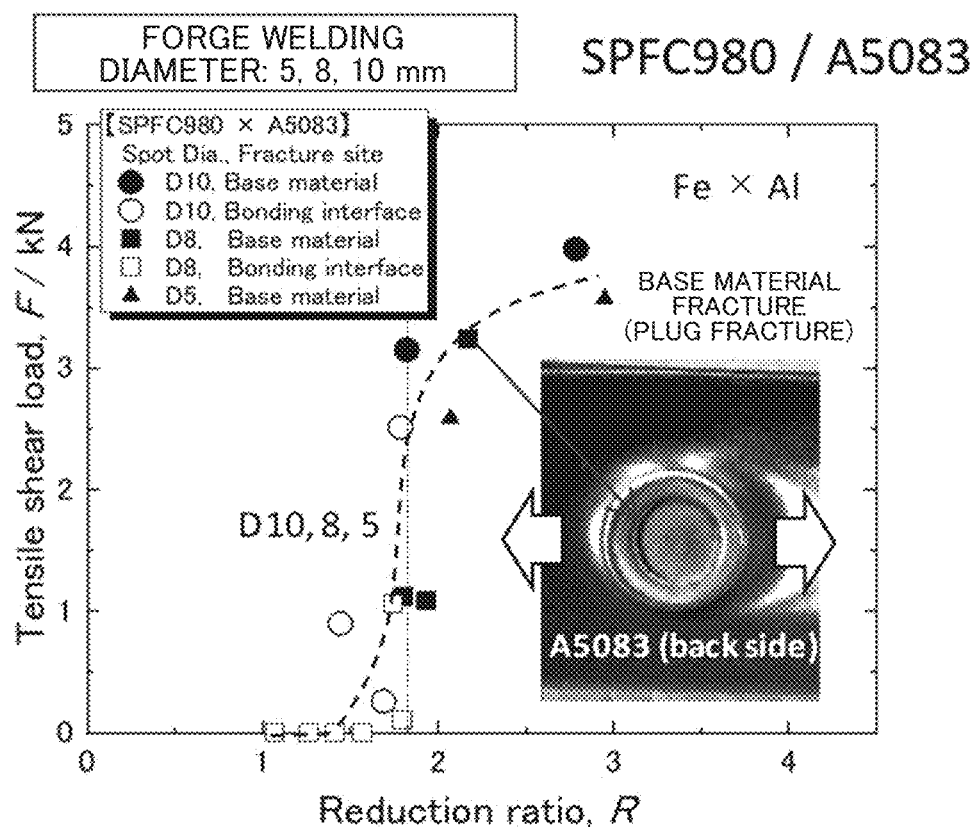
FIG. 8A illustrates a relationship between reduction ratio R and tensile shear load of a joint in the combination of SPFC980 (Fe) and A5083 (Al)

The results are illustrated in the graph of FIG. 8A.

Here, the tensile rate was set to 0.05 mm/s.

In the figure, blank markers indicate fracture at the bonding interface, and filled markers indicate base material fracture (plug fracture) on the aluminum alloy side.

Also in this case, transition of the fracture mode to base material fracture from interface fracture occurs at a reduction ratio R of 1.8 or more.

Figure 8B:
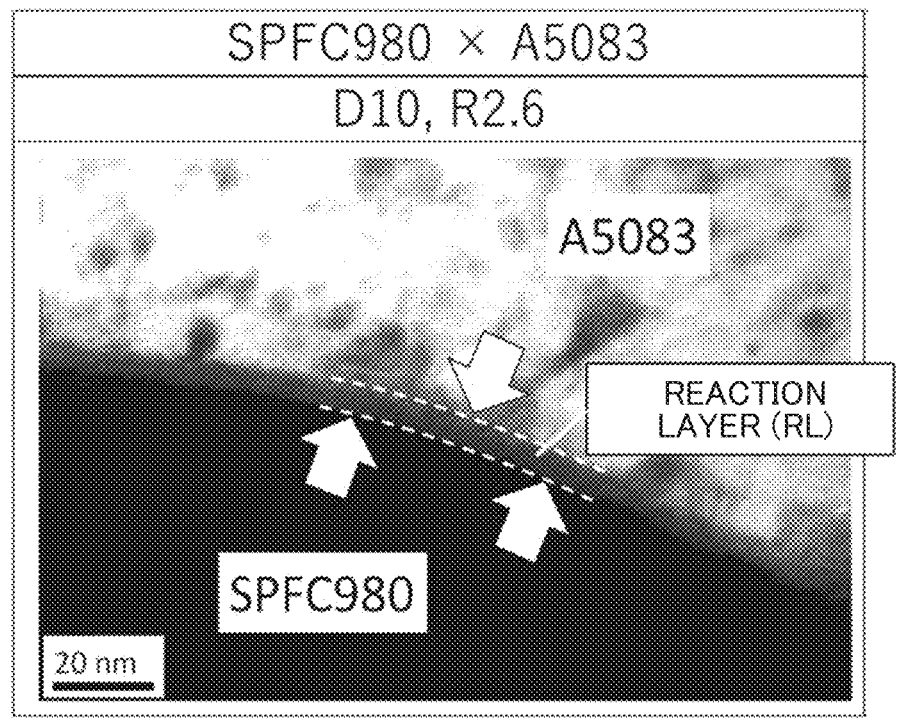
FIG. 8B illustrates a TEM image of a cross section of a joint part.

In FIG. 8B, a cross-sectional TEM image of a joint part center of a joint obtained by joining under the conditions of a forge welding diameter of 10 mm (D10) and a reduction ratio R of 2.6 is illustrated.

The thickness of the reaction layer (RL) at the bonding interface was suppressed to several nm level.

Example 3

Next, regarding an aluminum-based alloy, a test of dissimilar material joining between alloys and evaluation were performed.

An aluminum alloy JIS A2024 material and an aluminum alloy JIS A6061 material were superposed on each other, and forge welding was performed.

The A2024 material is an Al—Cu-based alloy sheet material, and the A6061 material is an Al—Mg—Si-based alloy sheet material.

Here, the temperature for preheating of the bonding interface was set to about 350° C.

Test pieces each having W=30 mm, L=100 mm, and $t_1=t_2=1$ mm were used.

Using a pressing jig of φ8 mm (forge welding diameter 8 mm), joining processing was performed in the same manner as in Example 1.

It has become apparent that superposition of A2024 having a higher strength in the first and the second metal materials on the upper side is easier to join the metal materials.

Figure 9:
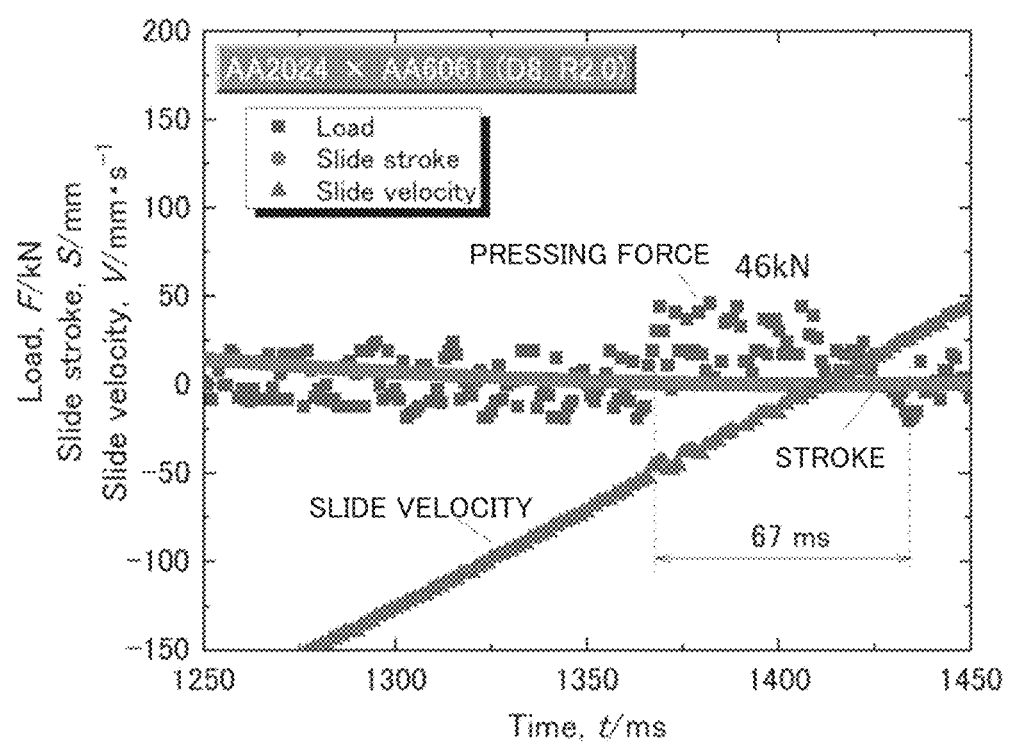
FIG. 9 illustrates a relationship between slide stroke, slide velocity and pressing force of an AC servo press machine in the joining of A2024 and A6061.

In FIG. 9, press processing data at a reduction ratio of 2.0 are illustrated. Processing time (ms) is plotted as abscissa, and press load (Load, kN), slide velocity (mm/s) and slide stroke (mm) are plotted as ordinate. The press peak load was about 46 kN, and the processing time was about 67 ms.

Figure 10:
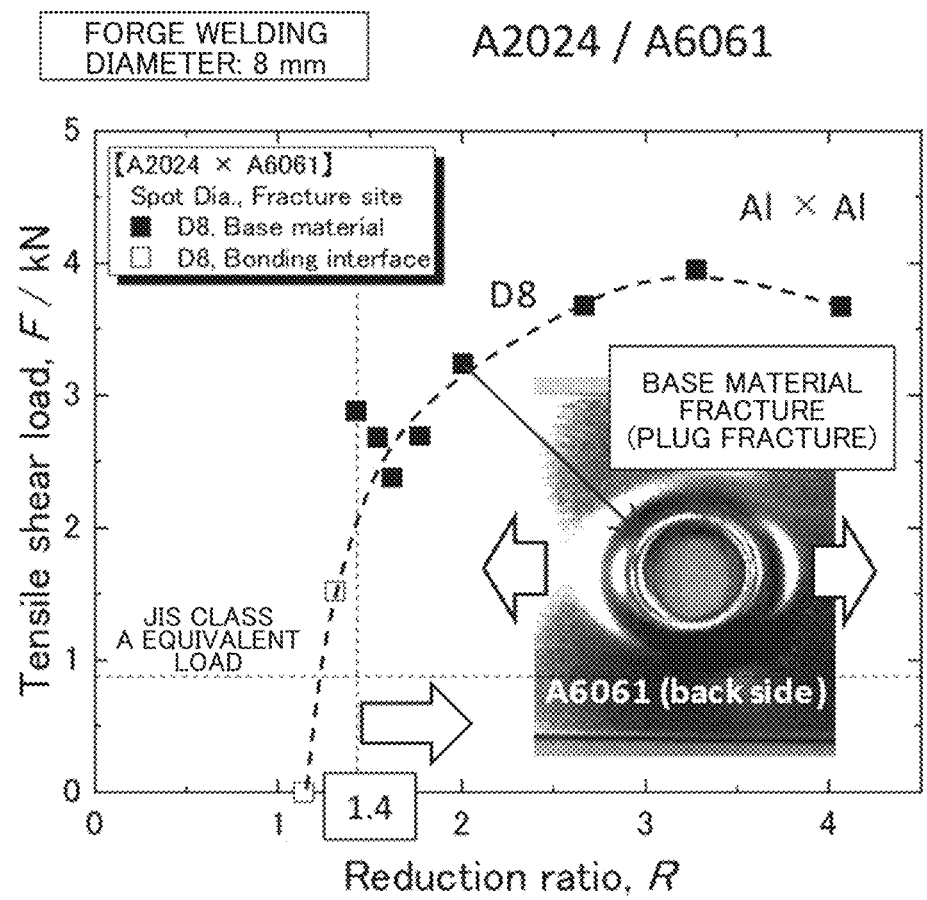
FIG. 10 illustrates a relationship between reduction ratio R and tensile shear load of a joint in the combination of A2024 (Al) and A6061 (Al).
Figure 11:
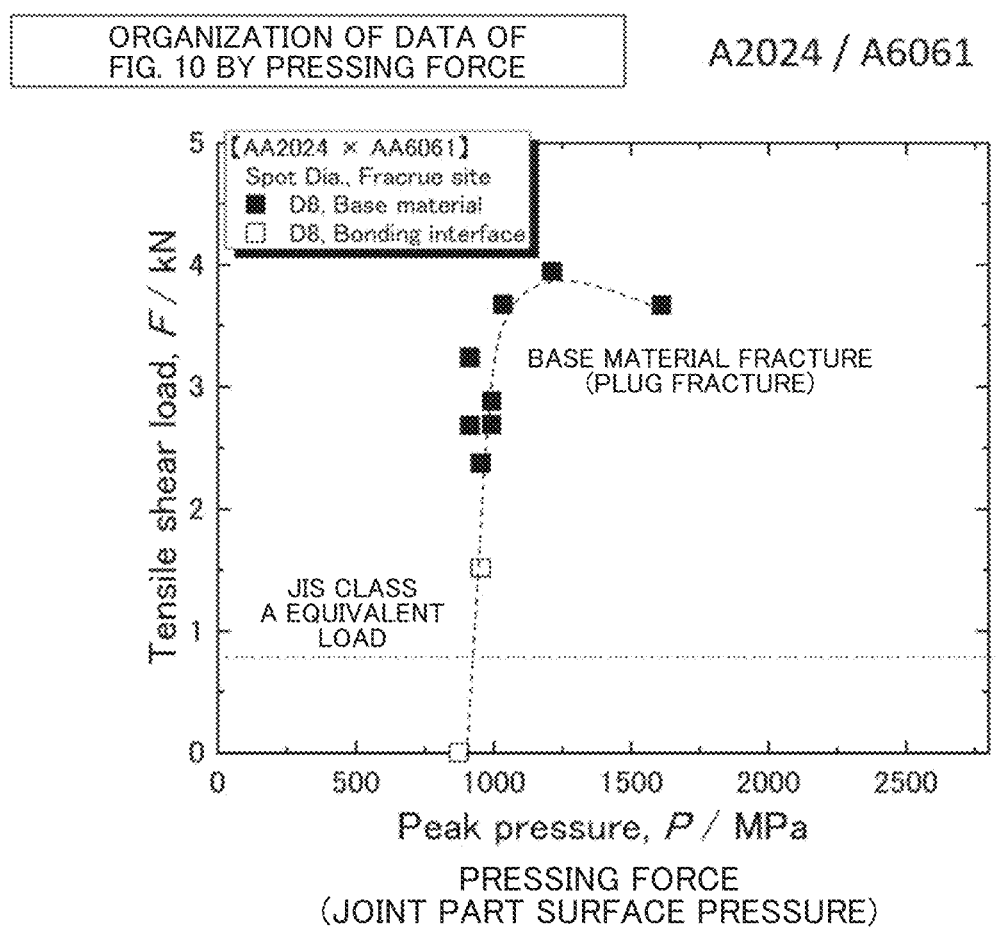
FIG. 11 illustrates a relationship between pressing force (joint part surface pressure) and tensile shear load of a joint in the combination of A2024 (Al) and A6061 (Al).

In FIG. 10, a graph of a relationship between reduction ratio R and tensile shear load F of a joint is illustrated, and in FIG. 11, a relationship between pressing force (joint part surface pressure) per unit area and tensile shear load F of a joint is illustrated.

In both of FIG. 10 and FIG. 11, blank markers indicate fracture at the bonding interface, and filled markers indicate base material fracture (plug fracture) on the A6061 side.

The present example is a case of aluminum-based metal materials, and base material fracture occurred at a reduction ratio R of 1.4 or more (FIG. 10).

On the other hand, when the same data were organized by the pressing force (surface pressure), base material fracture occurred at a pressing force of about 900 to 1,000 MPa or more (FIG. 11).

When FIG. 10 and FIG. 11 are compared, it has been found that the reduction ratio had a stronger correlation with the tensile shear load than the pressing force had, so that it can be said that quality control is preferably performed by the reduction ratio in the manufacturing line.

The control is preferably performed by the position control of punching or the measurement of the thickness of the joint part after joining.

It has also become apparent that when the tensile strength of A6061 (O material) was set to 125 MPa, the strength obtained by the present joining method sufficiently exceeded the tensile shear strength Class A (about 0.85 kN) of the spot welds between A6061 materials each having a sheet thickness of 1 mm, which is defined by JIS Z3140 (Method of inspection and acceptance levels for resistance spot welds).

Figure 12A:
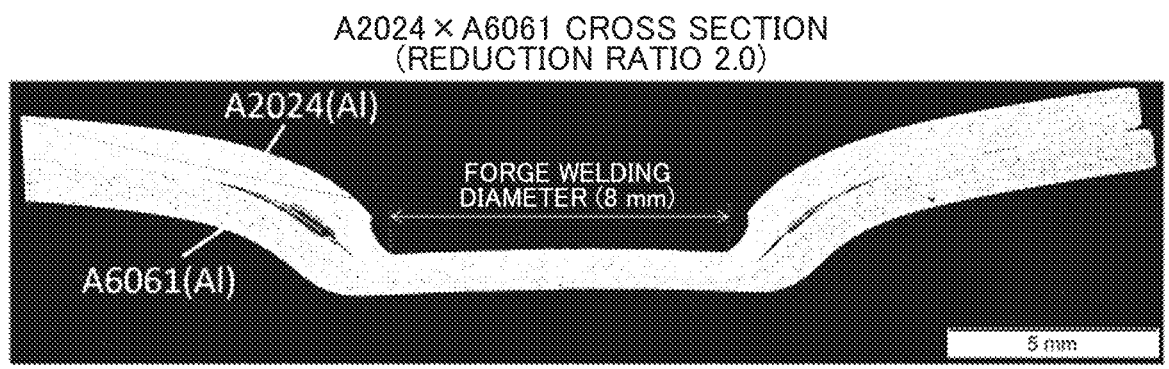
FIG. 12A illustrates a cross-sectional photomicrograph of a joint part in the combination of A2024 and A6061 taken by an optical microscope.
Figure 12B:
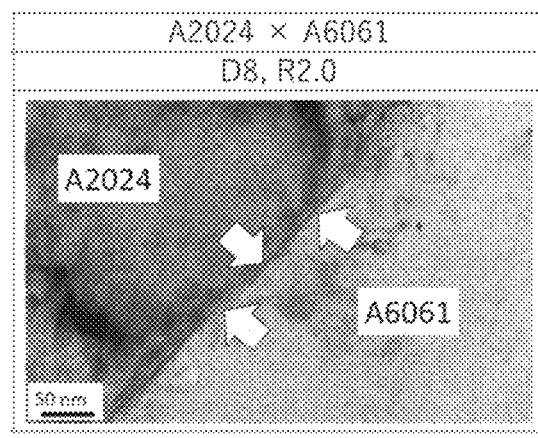
FIG. 12B illustrates a cross-sectional TEM image of a joint part interface.

A cross-sectional metallurgical photomicrograph of the joint part center in the combination of A2024/A6061 at a reduction ratio R of 2.0 is illustrated in FIG. 12A, and a TEM image thereof is illustrated in FIG. 12B.

It can be seen that the thickness of the joint part decreased, and a plastic flow appeared, similarly to Example 1.

From the photomicrograph of FIG. 12B, a special reaction layer was not observed at the interface.

When the bonding cross section of FIG. 12A is observed, joining occurs at the mutually forge-welded interface, and on both sides of the indentation, a very small gap is also observed.

Accordingly, it can be understood that the joint part is a place where pressing is selectively performed by punching, and also in the present example, the bonding surface thereof (plastic flow interface) is not a side surface, and further, the bonding strength does not depend on the mechanical joining mechanism.

Figure 13:
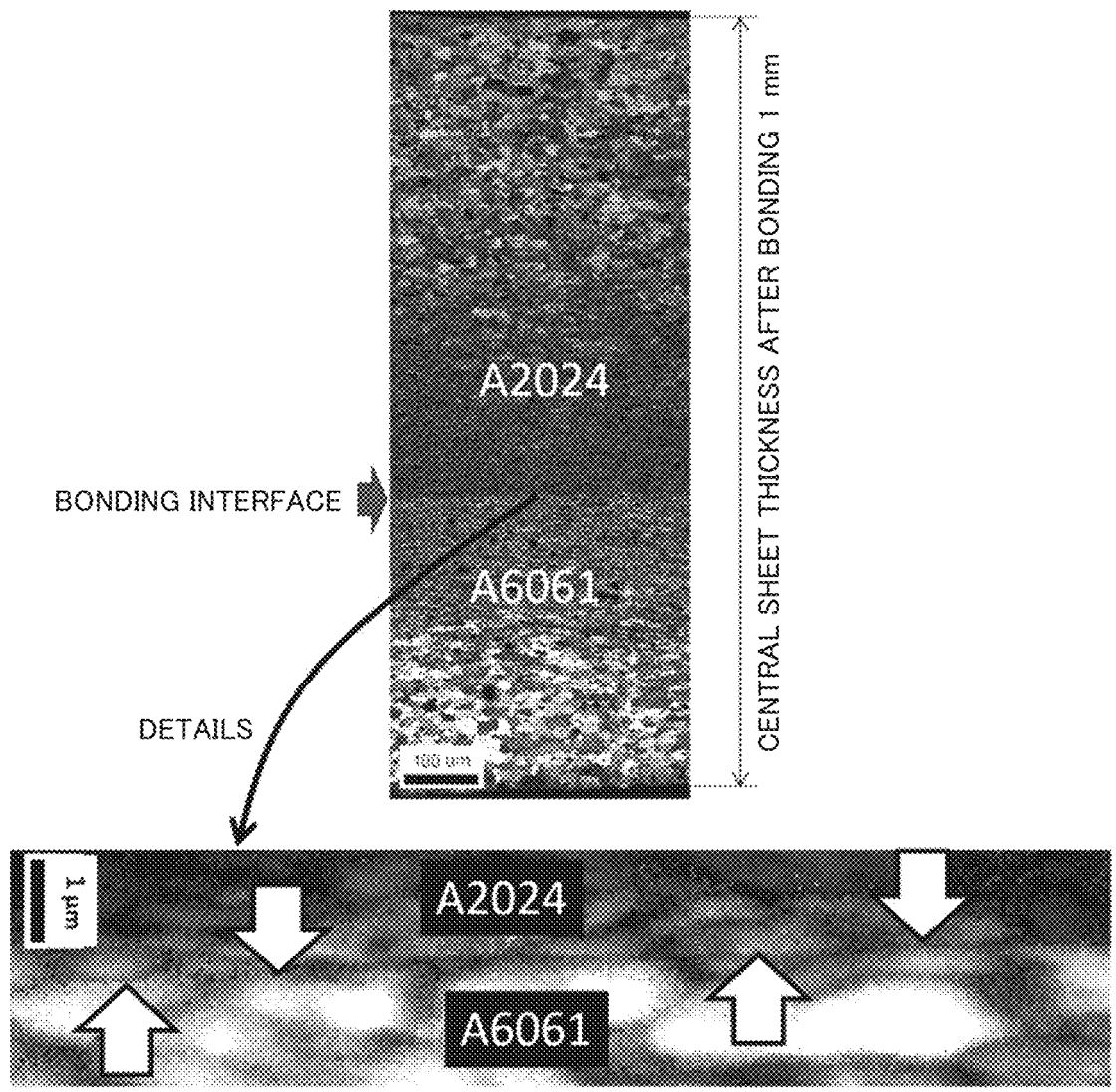
FIG. 13 illustrates results of crystal orientation analysis of a joint part cross section in the combination of A2024 and A6061.

In FIG. 13, results of crystal orientation analysis of the bonding interface by the Field Emission Scanning Electron Microscope (FE-SEM)—Electron Back Scattered Diffraction (FBSD) method are illustrated.

In this display, an inverse pole figure crystal orientation (IPF) map and an image quality (IQ) map overlap each other. The whole of the cross section and enlarged details of the bonding interface are illustrated.

From this, it can be seen that grain refinement is promoted more by the dynamic recrystallization as the bonding interface is approached. That is to say, it can be seen that the plastic flow more strongly occurs as the bonding interface is approached.

As described above, according to the joining method of the disclosure, dissimilar material joining between the same type alloys can be performed with high productivity as well.

For example, joining between a casting material and an expanded material, both materials being aluminum alloys, is possible.

In the fusion welding of a casting material, there is concern about occurrence of gas holes that brings about reduction of fatigue strength, but the present joining method does not bring about occurrence of gas holes.

Moreover, the present joining method is a joining method suitable for parts or products requiring cleanliness because sputter that is a problem in the fusion welding is not generated.

A wide range of other combinations of joining materials were subjected to experiments to confirm bondability of the present method, so that they will be described.

Figure 14:
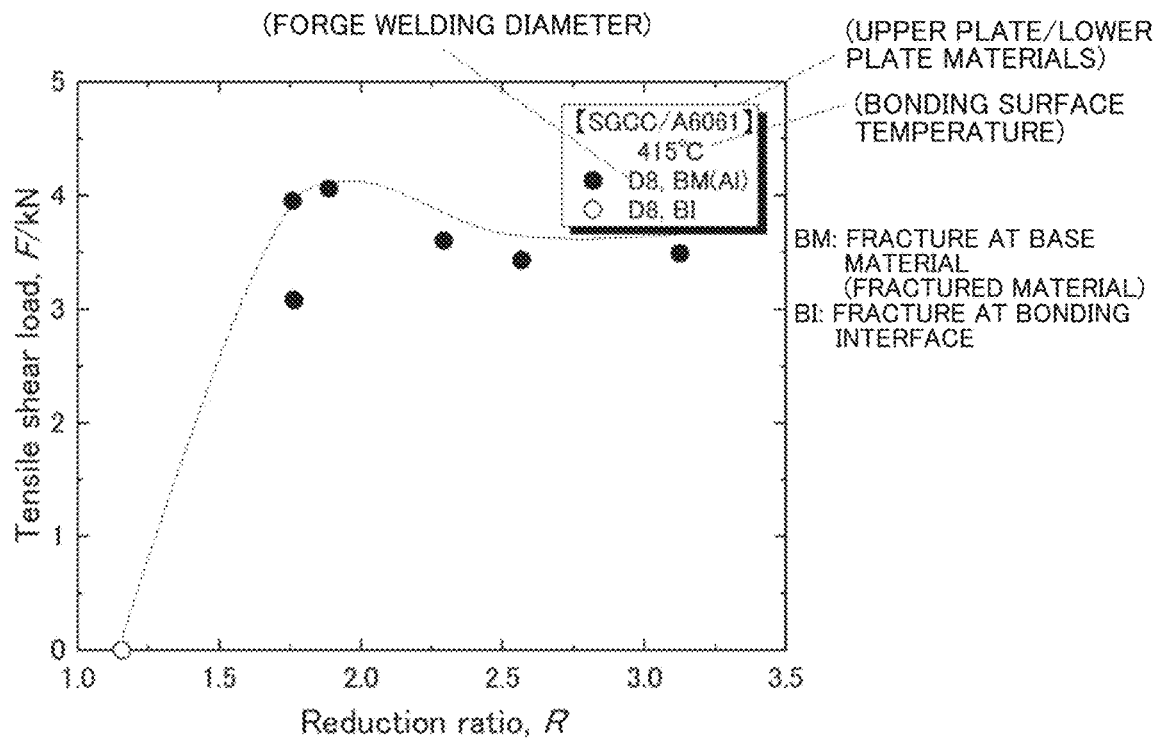
FIG. 14 illustrates a relationship between reduction ratio R and tensile shear load of a joint in the combination of SGCC (Fe) and A6061 (Al).

FIG. 14 illustrates a combination of first metal material SGCC (Fe)/second metal material A6061 (Al).

Here, SGCC is a hot-dip galvanized steel sheet using a cold-rolled steel plate as a raw material.

In the graph illustrated in FIG. 14, reduction ratio R is plotted as abscissa, and tensile shear load of a joint is plotted as ordinate In the graph, there are displayed, as annotations, a combination of upper plate (first metal material)/lower plate (second metal material) and a bonding surface temperature during the bonding below the combination.

D8 indicates that the forge welding diameter is 8 mm, a filled marker indicates base material fracture (BM), and a blank marker indicates bonding interface fracture (BI).

In the combination of SGCC/A6061, base material fracture has been found to occur at a reduction ratio R of at least 1.7 or more.

Examples of the bondability confirmation experiments by the present method are further shown below. A relationship between reduction ratio (R) and tensile shear load is illustrated. Here, annotations are displayed in the graphs in the same manner as in FIG. 14 (combination of joining materials, bonding surface temperature, forge welding diameter, fracture mode).

Figure 15:
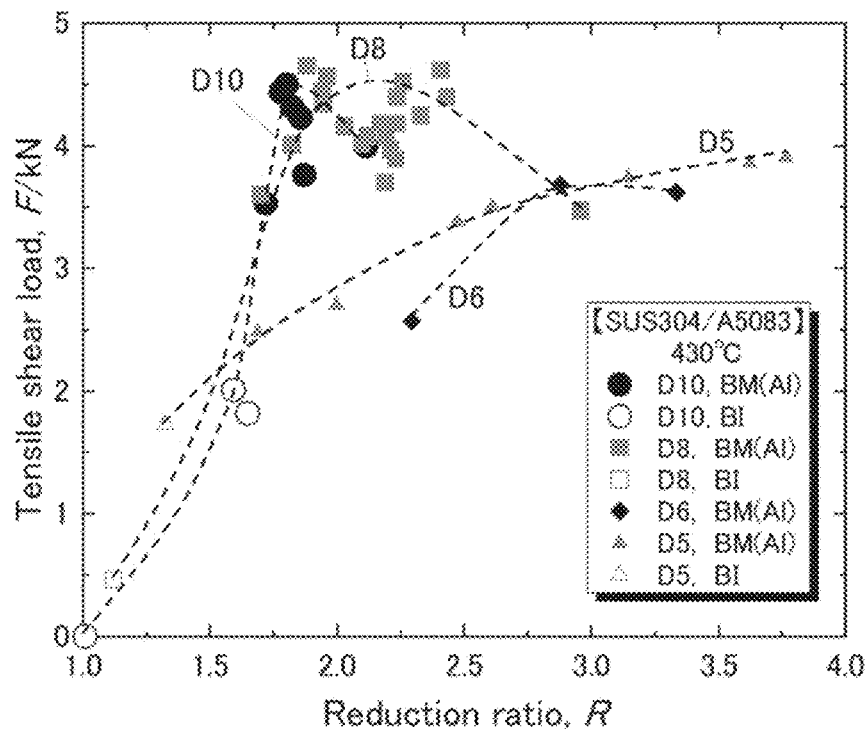
FIG. 15 illustrates a relationship between reduction ratio R and tensile shear load of a joint in the combination of SUS304 (Fe) and A5083 (Al).

FIG. 15 illustrates SUS304 (Fe)/A5083 (Al).

Here, SUS304 is an austenite-based stainless steel plate material.

Figure 16:
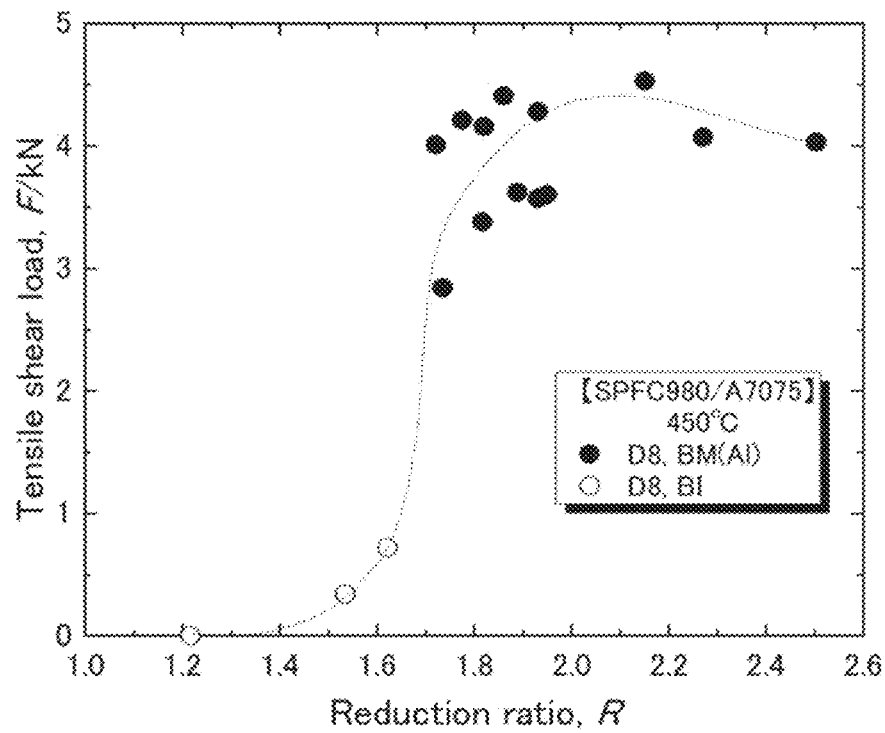
FIG. 16 illustrates a relationship between reduction ratio R and tensile shear load of a joint in the combination of SPFC980 (Fe) and A7075 (Al).

FIG. 16 illustrates SPFC980/A7075 (Al).

Here, A7075 is an Al—Zn—Mg-based aluminum alloy sheet material.

Figure 17:
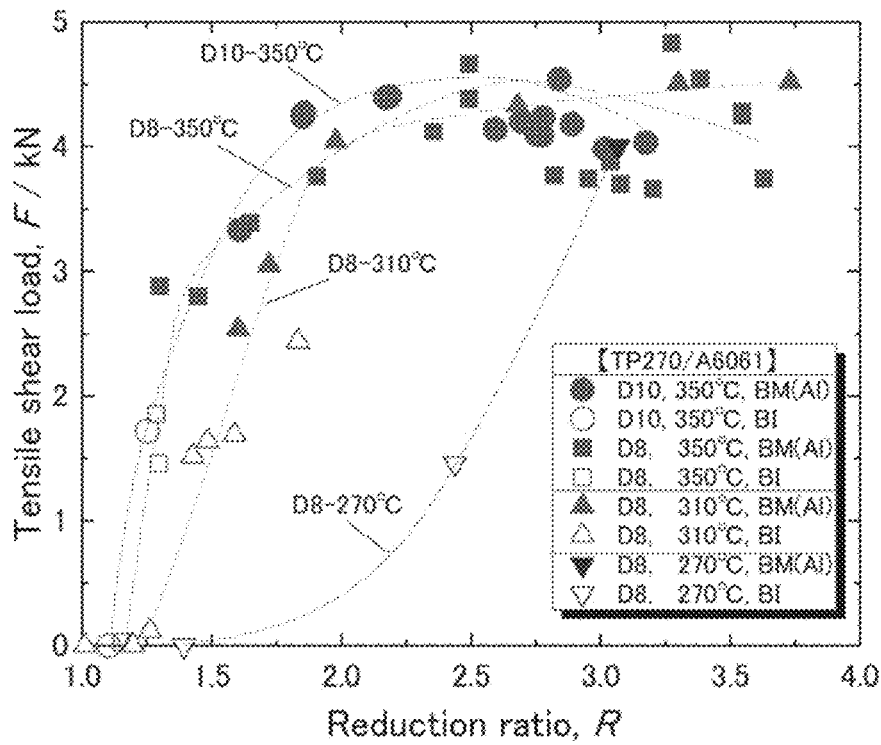
FIG. 17 illustrates a relationship between reduction ratio R and tensile shear load of a joint in the combination of TP270 (Ti) and A6061 (Al).

FIG. 17 illustrates TP270 (Ti)/A6061 (Al).

Here, TP270 is a pure titanium plate material.

Figure 18:
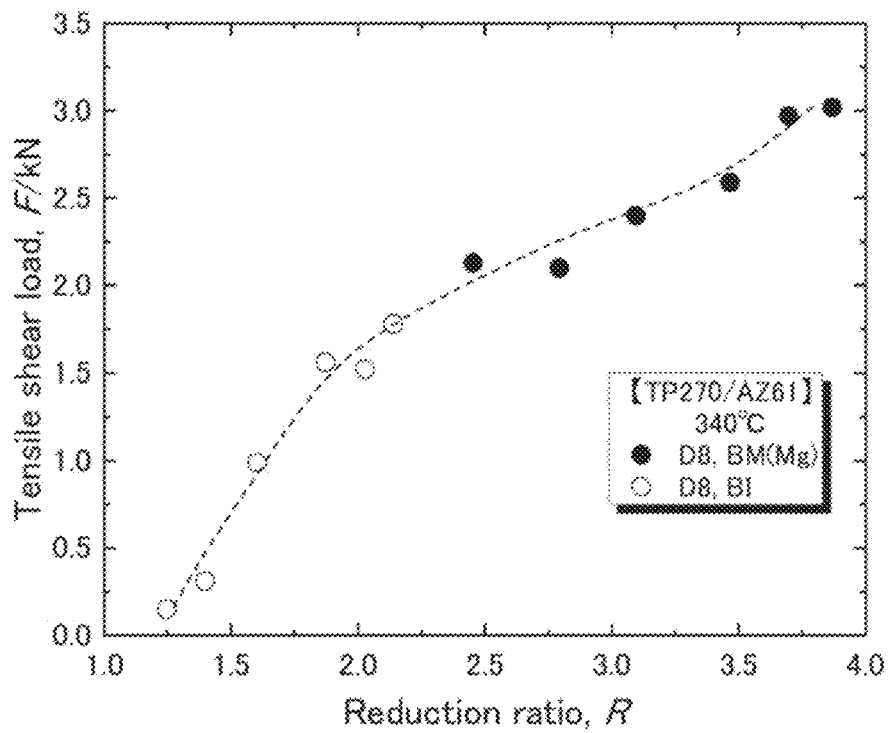
FIG. 18 illustrates a relationship between reduction ratio R and tensile shear load of a joint in the combination of TP270 (Ti) and AZ61 (Mg).

FIG. 18 illustrates TP270 (Ti)/AZ61 (Mg).

Here, AZ61 is an Mg—Al—Zn-based magnesium alloy sheet material.

Figure 19:
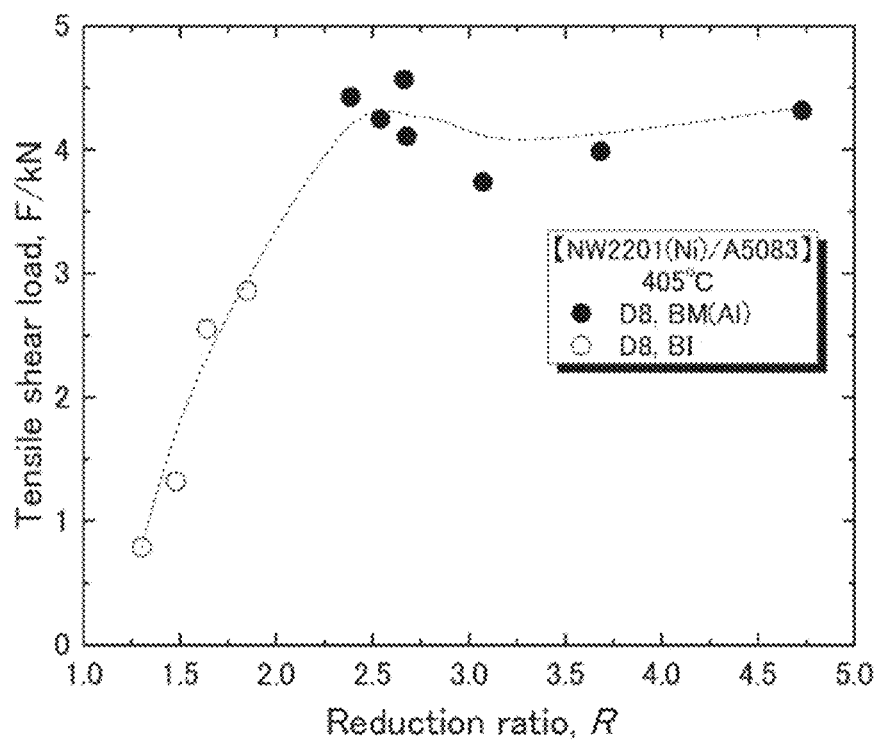
FIG. 19 illustrates a relationship between reduction ratio R and tensile shear load of a joint in the combination of NW2201 (Ni) and A5083 (Al).

FIG. 19 illustrates NW2201 (Ni)/A5083 (Al).

Here, NW2201 is a nickel plate material of a purity of 99%.

From these graphs, it can be seen that in any of the above combinations, good bonding strength was obtained by setting a reduction ratio to a certain value or more.

Figure 20:
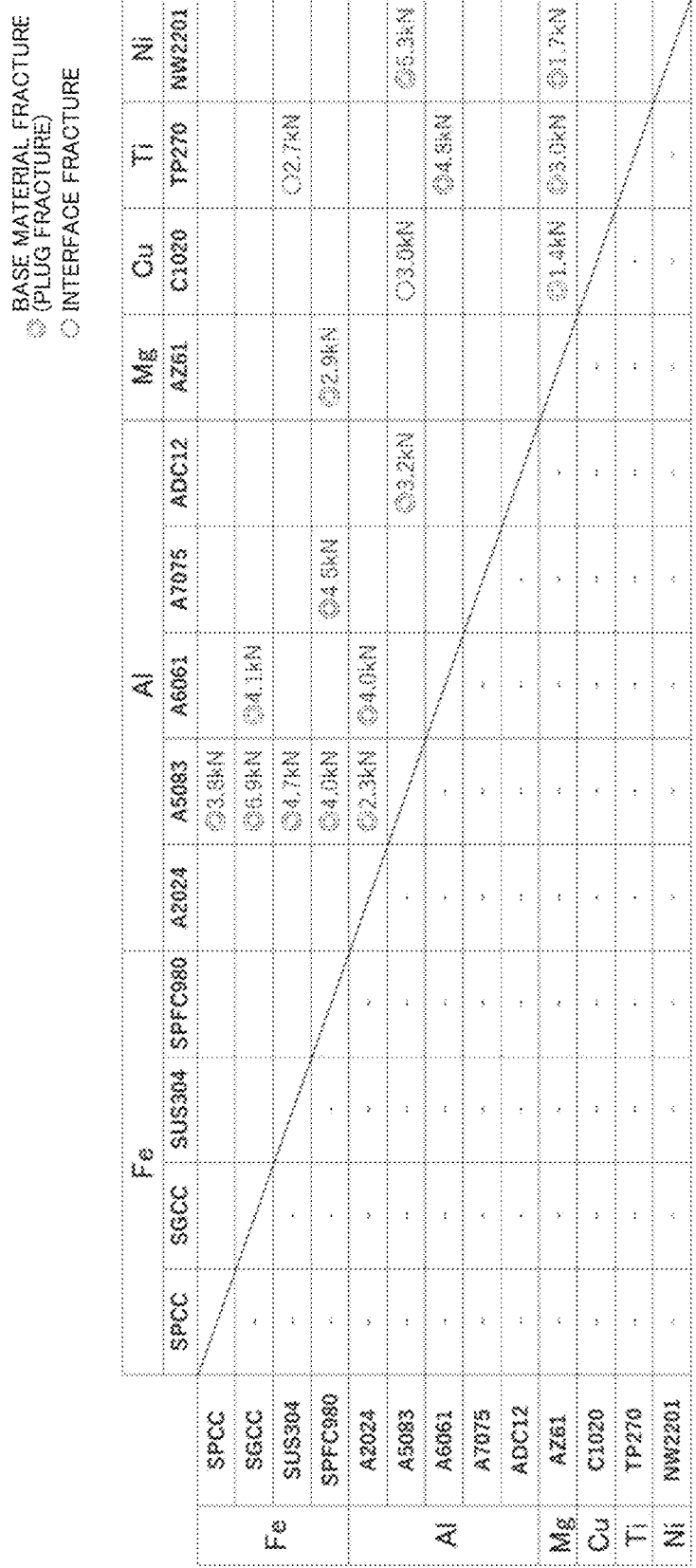
FIG. 20 illustrates a list of combinations of joining materials and fracture strengths thereof.

Fracture strengths in combinations of materials are listed in FIG. 20 including other combinations than the above, which have been examined.

In the table, "⊙" indicates base material fracture, and "○" indicates bonding interface fracture.

The value shown next to "⊙" or "○" represents fracture strength.

In the table, the combination given by intersection of a metal material shown in the vertical direction with a metal material shown in the crosswise direction is a combination for joining, and the fracture strength is displayed in the cell.

For example, it is indicated that the bonding strength between Fe (SPCC) and Al (A5083) was 3.8 kN.

The joining conditions in this table are a sheet thickness of 1 mm, a width of 30 mm, a length of 100 mm, a forge welding diameter of D8 (diameter 8 mm), and a pressing time (bonding time) of 82 ms.

Regarding the combination of SPCC and A5083 of Example 1, however, the sheet thickness was set to 1 mm, the width was set to 20 mm, the length was set to 80 mm, and the forge welding diameter was set to D10 mm.

Regarding the combination of SPFC980 and A5083 of Example 2, the maximum strength in FIG. 20 was set to a value of forge welding diameter D10 (4.0 kN), as illustrated in FIG. 8.

In the table, C1020 is a pure copper (oxygen-free copper) plate material of a purity 99.96% or more.

From this, it can be seen that the disclosure enables high-strength joining between a wide range of various dissimilar materials for a short time without using an insertion material.

Moreover, also between similar materials that basically form no inter metallic compound, direct joining is possible.

INDUSTRIAL APPLICABILITY

In the method for joining metal materials according to the disclosure, spot joining can be performed in a shorter time than before in a low-temperature process, and therefore, the method can be utilized in a wide range of fields requiring joining of metal materials, such as fields of vehicles, aircrafts, and industrial machinery.

In a specific use example, it becomes easy to incorporate a forge welding machine in, for example, an assembly line for vehicles or a manufacturing line for industrial machinery.

In this case, the forge welding machine can become a substitute for a resistance spot welding machine that has been incorporated in a conventional line.

Furthermore, the method of the disclosure can also be expanded to joining of power supplies, harnesses, bus bars, etc. and to joining of electrodes, terminals, etc.

Speaking of application to, for example, battery electrodes of automobiles, etc. requiring dissimilar material joining between a copper material and an aluminum material, and harnesses, the method of the disclosure becomes a joining method of high productivity that substitutes for an ultrasonic joining method and a caulking method that are currently used, and a friction stir welding method (FSW), application and development of which have been promoted in some areas.

What is claimed is:

1. A method for joining metal materials, comprising applying a spot load with a die and a punch to a joint part between dissimilar metal materials consisting of a first metal material and a second metal material in a state where sites to form the joint part are superposed on each other without mechanical joining due to undercutting around the joint part, wherein a plastic flow is produced at a bonding interface so as to perform a solid phase diffusion bonding at a bonding interface temperature of 270 to 450° C. so that a thickness of an inter metallic compound (IMC) to be generated at a bonding interface is 1 μm or less, wherein when a total thickness of the first metal material and the second metal material at the joint part before bonding is defined as $T_0$ mm, the total thickness thereof after bonding is defined as $T_1$ mm, and $T_0/T_1=R$ is defined as a reduction ratio, the reduction ratio R is 1.8 or more.

2. The method for joining metal materials according to claim 1, wherein the spot load is applied by using the die which is heated by a heater, and the punch having a circumscribed circle diameter of 3 to 15 mm, and a mounting surface of the die is mounted to a flat surface or a curved surface such as a lens.

3. The method for joining metal materials according to claim 1, wherein the dissimilar metal materials are any one of combinations that include a combination of an iron-based metal material and an aluminum-based metal material, a combination of an iron-based metal material and a magnesium-based metal material, a combination of an aluminum-based metal material and a copper-based metal material, a combination of an iron-based metal material and a titanium-based metal material, a combination of an aluminum-based metal material and a titanium-based metal material, a combination of a magnesium-based metal material and a titanium-based metal material, a combination of a nickel-based metal material and an aluminum-based metal material, a combination of a nickel-based metal material and a magnesium-based metal material, and a combination of a copper-based metal material and a magnesium-based metal material.

4. A method for controlling a bonding quality of metal materials, comprising controlling with a reduction ratio R the bonding quality of dissimilar metal materials consisting of a first metal material and a second metal material to which a spot load is applied at a joint part between the first metal material and the second metal material in a state where sites to form the joint part are superposed on each other without mechanical joining due to undercutting around the joint part, wherein a plastic flow is produced at a bonding interface so as to perform a solid phase diffusion bonding at a bonding interface temperature of 270 to 450° C. so that a thickness of an inter metallic compound (IMC) to be generated at a bonding interface is 1 μm or less, wherein when a total thickness of the first metal material and the second metal material at the joint part before bonding is defined as $T_0$ mm, the total thickness thereof after bonding is defined as $T_1$ mm, and $T_0/T_1=R$ is defined as the reduction ratio.

5. The method for joining metal materials according to claim 1, wherein the first metal has higher strength than the second metal which is mounted on the die.

6. The method for joining metal materials according to claim 1, wherein when applying the spot load, the plastic flow toward a periphery of the joint part is not hindered by the die.

* * * * *